(12) United States Patent
Wong et al.

(10) Patent No.: US 6,640,142 B1
(45) Date of Patent: Oct. 28, 2003

(54) SYSTEM AND METHOD FOR CONTROLLING WORKSPACE ENVIRONMENT

(75) Inventors: Danny Cy Wong, Allendale, NJ (US); Paul A. Moskowitz, Yorktown Heights, NY (US); Ali Afzali-Ardakani, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 09/631,376

(22) Filed: Aug. 2, 2000

(51) Int. Cl.$^7$ .............................................. G05B 13/02
(52) U.S. Cl. ............................. 700/28; 700/2; 700/19; 700/276; 236/49.3
(58) Field of Search .......................... 700/28, 2, 19–20, 700/276; 236/49.3; 454/49, 370

(56) References Cited

U.S. PATENT DOCUMENTS

| | | | |
|---|---|---|---|
| 4,045,327 A | | 8/1977 | Noma et al. ................. 359/237 |
| 4,167,834 A | | 9/1979 | Pickles ........................ 49/358 |
| 4,257,192 A | | 3/1981 | Bartholomew ............... 49/140 |
| 4,892,394 A | | 1/1990 | Bidabad ...................... 359/275 |
| 4,942,805 A | * | 7/1990 | Hellwig et al. .............. 454/184 |
| 5,024,022 A | | 6/1991 | Ito .............................. 49/139 |
| 5,076,673 A | | 12/1991 | Lynam et al. ................ 359/271 |
| 5,119,412 A | * | 6/1992 | Attallah ....................... 379/102 |
| 5,146,977 A | * | 9/1992 | Kiser .......................... 165/15 |
| 5,238,452 A | * | 8/1993 | Levy et al. ................... 454/306 |
| 5,657,149 A | | 8/1997 | Buffat et al. ................. 359/275 |
| 5,675,487 A | * | 10/1997 | Patterson et al. ............. 700/56 |
| 5,725,148 A | * | 3/1998 | Hartman ..................... 236/49.3 |
| 5,725,809 A | | 3/1998 | Varaprasad et al. ......... 252/583 |
| 5,771,042 A | * | 6/1998 | Santos-Gomez ............ 345/342 |
| 6,039,390 A | * | 3/2000 | Agrawal et al. ............. 296/211 |
| 6,246,505 B1 | * | 6/2001 | Teowee et al. ............... 359/241 |
| 6,366,832 B2 | * | 4/2002 | Lomonaco et al. .......... 700/276 |
| 2002/0084042 A1 | * | 7/2002 | Kimmet ..................... 160/84.04 |

* cited by examiner

*Primary Examiner*—George B. Davis
*Assistant Examiner*—Ronald D Hartman, Jr.
(74) *Attorney, Agent, or Firm*—Whitham, Curtis & Christofferson, P.C.; Stephen C. Kaufman (57) ABSTRACT

An occupant of a cubicle or office can activate transparent partitions to partially or completely enclose a cubicle and/or office to minimize noise, optimize privacy, lighting, air flow and temperature. This transparent partition is coated with a thin layer material connected to electrodes. Once the occupant decides that changing working conditions (e.g., minimize noise, optimize privacy, adjust lighting, air flow and/or temperature) is needed, the occupant can activate the thin transparency control layer by appropriate electronic control. Movable parts of the partitions may also be adjusted. The transparent partitions may be made darker or opaque. Movable partitions may be used to provide optimized privacy, noise level, lighting, air flow and temperature control. Conversely, the partitions may be made transparent and movable sections retracted to permit greater worker-to-worker interaction.

14 Claims, 6 Drawing Sheets

SYSTEM AND METHOD FOR CONTROLLING WORKSPACE ENVIRONMENT

BACKGROUND OF THE INVENTION

1. Field of the Invention

The present invention generally relates to an intelligent workspace environment and, more particularly, to the application of information systems and electronic controls to cubicle and/or office partitions in order to optimize privacy, control lighting and sound, and thus increase the comfort level of those occupying the workspace.

2. Background Description

The most common complaints in the workspace environment are privacy, noise, lighting, air flow and temperature. These issues are distracting to workers in a cubicle workspace environment. Typically, the cubicle workspace provides a uniform work environment with partial-height partitions and uniform workspace environment. This does not meet individual worker's needs. Optimizing the workspace comfort level can raise worker's productivity. Additionally, there are times when group interactions are required and privacy must be minimized to increase worker productivity.

SUMMARY OF THE INVENTION

This present invention allows the occupant of a cubicle or office to activate transparent partitions which can partially or completely enclose a cubicle and/or office to minimize noise, optimize privacy, lighting, air flow and temperature. This transparent partition is coated with a thin layer material (e.g., Liquid Crystal Polymer, Electrochromic, or Electrophoretic material) connected to electrodes. Once the occupant decides that changing working conditions (e.g., minimize noise, optimize privacy, adjust lighting, air flow and/or temperature) is needed, the occupant can activate the thin transparency control layer by appropriate electronic control. Movable parts of the partitions may also be adjusted. The transparent partitions may be made darker or opaque. Movable partitions may be used to provide optimized privacy, noise level, lighting, air flow and temperature control. Conversely, the partitions may be made transparent and movable sections retracted to permit greater worker-to-worker interaction.

The invention comprises the following system elements:
1. The transparent partitions may be single or multilayer glass or fiber glass or transparent polymeric materials (e.g, Plexiglass) coated with a thin layer of material (e.g. Liquid Crystal Polymer, Electrochromic or Electrophoretic materials). The transparent partitions become opaque, when an appropriate electronic signal is sent through the thin layer of material.
2. The transparent partitions can be installed at a fixed position, or/and it can be installed at a movable location. For example, the fixed transparent partition can be like a traditional cubicle or office partitions. The movable transparent partitions can be hidden inside transparent or traditional partitions, ceiling or walls, when the movable transparent partitions are not in use. The cubicle or office becomes partially or completely enclosed based on the occupant's preference to suit individual-defined comfort in the workspace environment (e.g., privacy, lighting, noise level, air flow and temperature), when the movable transparent partitions equipped with motorized automation are activated.
3. A local information system (e.g., client, desktop computer, workstation) is used to control the motorized or movable transparent partitions. The information system needs to receive sensing information from sensors which monitor noise level, brightness, air flow/temperature. The movable transparent partitions controlled by the information system can be activated based on the default setting in the information system which monitors the inputs from the environmental sensors. The system can be activated based on an occupant's command.
4. The local computing system can communicate with a central information system (e.g., a server) via a network (e.g., an Ethernet Local Area Network (LAN), a Token-Ring LAN, Transmission Control Protocol/Internet Protocol (TCP/IP)) which allows the central information system to monitor and control the moveable transparent partitions. For examples, in the case of an emergency (e.g., a fire) it may be necessary to change the deployment of the partitions.
5. The movable transparent partitions may use wireless communication capability to transmit and receive wireless data. An example of such wireless communications is a system based on the Bluetooth wireless standard which may be embedded in the local information system. A mobile computing device, e.g., a Personal Digital Assistant (PDA) with wireless capability may be employed to control the movable transparent partitions.

The invention comprises the following method of use: When the occupant initiates a command stream to activate the transparent partitions (either fixed or movable) via either wireless communication from the PDA or directly from the local computing system, the appropriate signal will activate the transparent thin layer of coated material to make it opaque. Additional commands will be attached to the command stream to enclose, partially or completely, the cubicle or office using the movable transparent partitions. The PDA will broadcast its information (e.g., command, environmental parameter settings) over a radio channel to a device in the local computing system (e.g., contains control, interface and driver circuits) to control the transparent partitions. In order to be sure that the information is transmitted from the occupant of the cubicle or office, an authentication process will be conducted to check the digital keys. All the status information (e.g., the partitions are open or closed, transparent or opaque, malfunction status of parts) of the transparent partitions will be transmitted back to the local computing system. In turn, a copy of the status information will be transferred to the central information system for updating the server database.

The activation of the transparent partitions can also be initiated automatically based on the default environmental setting in the local computing system. The default environmental setting can be directly set from the local computing system, from the central computing system (i.e., server) or via wireless communication from the PDA. The default environmental setting may consist of the cubicle environment parameters, such as noise level, brightness, air flow/temperature, and it also may include the time (e.g., too much reflected natural light at 2:00 PM) and date to activate the transparent partitions, how much to close the transparent partitions (e.g., partial or complete closure). The ability to control the environmental setting empowers individuals to define their own workspace comfort.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
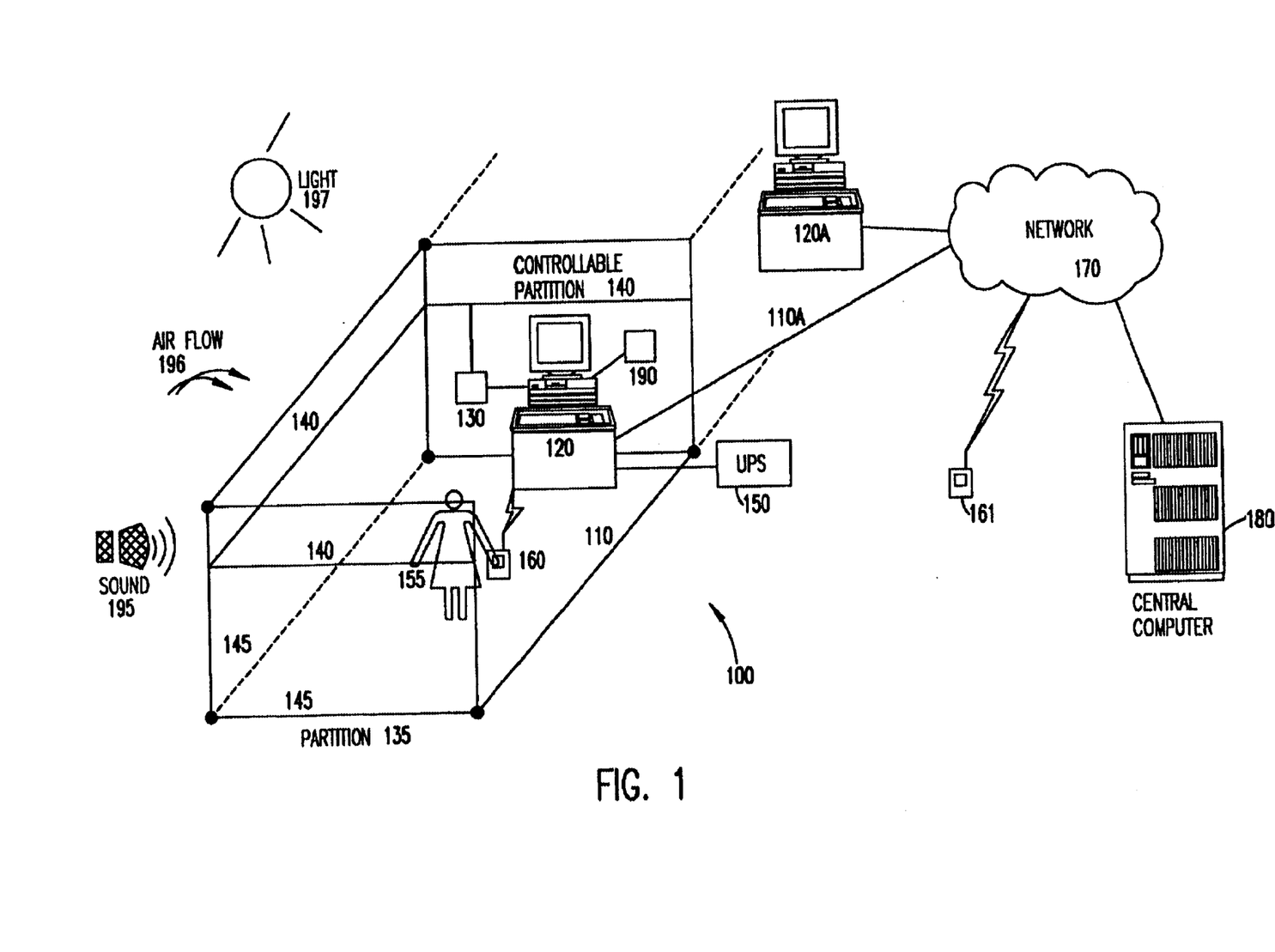
FIG. 1 is a pictorial diagram illustrating the workplace environment.

Referring now to the drawings, and more particularly to FIG. 1, there is shown the workplace environment 100. The workplace is divided into individual work spaces 110, 110a, etc. by means of partitions 135. In our preferred embodiment, at least some of the area of the partitions may consist of a controllable partition 140 that may be varied in transparency (from completely transparent to opaque), or withdrawn either partly or completely into another partition area 145. The control of the partitions is aimed at controlling the environment of the workplace which may include ambient light 197, air flow 196, and sound 195.

The users of the workspace 155 may find that the ambient sound, air flow and lighting conditions are not optimum. Accordingly, each workspace is equipped with a local computing system 120, 120a, etc. The local computing system may be a laptop computer such as the IBM ThinkPad computer or a personal computer (PC) such as the IBM Aptiva PC, but it may also be an embedded computing device comprising an Intel Pentium microprocessor, or other microprocessor. Such computing systems containing processors, memory, storage devices, and input/output (I/O) capability are well known. The function of the local computing system will be explained in greater detail in FIG. 2.

Continuing the description of FIG. 1, the local computing system is connected to a set of sensors 190 and to a set of control systems 130. The sensors are used to monitor the ambient environment parameters such as light intensity 197, air flow 196 (and also temperature and humidity) and sound levels 195. Such sensor systems which may be interfaced to a computing device are manufactured by Johnson Controls, Inc., of Milwaukee, Wis., or Honeywell, Inc., of Morristown, N.J. The purpose of the control system 130 is to control the state of the controllable partition 140. For example, the transparency (from transparent to opaque) of the partition may be varied in response to the ambient sound or light levels. The transparency or color of glass or plastic panels may be varied by electronic means using electrophoretics, electrochromics, electrochromatics, or chromogenics. These means are described, for example, in U.S. Pat. No. 4,045,327 to Noma et al., U.S. Pat. No. 4,892,394 to Bidabad, U.S. Pat. No. 5,076,673 to Lynam et al., U.S. Pat. No. 5,657,149 to Buffat et al., U.S. Pat. No. 5,725,809 to Varaprasad et al., and U.S. Pat. No. 6,039,390 to Agrawal et al., incorporated herein by reference. In addition, the control system may withdraw the controllable partition in response to an ambient condition in which the combination of air flow and perhaps temperature and humidity are not appropriate for the comfort of the workspace occupant. Means for moving transparent partitions by electromechanical control systems are well know in the automotive industry and are the subject of U.S. Pat. No. 4,167,834 to Pickels, U.S. Pat. No. 4,257,192 to Bartholomew, and U.S. Pat. No. 5,024,022 Ito, incorporated herein by reference. The partitions may also be moved in the case of an emergency requiring evacuation such as a fire or power failure. In order to supply power to the local computing system 120 and the control systems 130, an uninterruptible power supply (UPS) may be employed. Such power supplies are manufactured by APC, American Power Conversion of West Kingston, R.I.

Instructions and set parameters for the local computing system 120 may be entered directly and stored within the system. The local computing systems 120, 120a, etc. may be linked through a network 170 to a central computer 180. The central computer may include a server which stores instructions and parameters to be relayed to the local computing systems.

Instructions may also be entered using a mobile computing device 160 either through a cable or wireless connection. The wireless connection may be by the Bluetooth radio standard or an IEEE 802.11 wireless local area network or infrared IrDA. An example of a mobile device is a personal digital assistant (PDA), the PalmnPilot manufactured by Palm Inc. of Santa Clara, Calif., or a laptop computer such as the ThinkPad computer manufactured by the IBM Corp. of Armonk, N.Y. The network 170 may be the Internet, an internal (intranet) network, or a PSTN (public switched phone network), either wired or wireless PSTN, Ethernet or Token Ring LAN, TCP/IP network or WAP (Wireless Application Protocol) network. The central computer 180 may be an RS-6000 computer running a server program such as WebSphere, both products of the IBM Corp. Also, a wireless mobile computing device such as a cell phone, PDA, wireless-equipped laptop computer 161 may be connected to the network 170.

Figure 2:
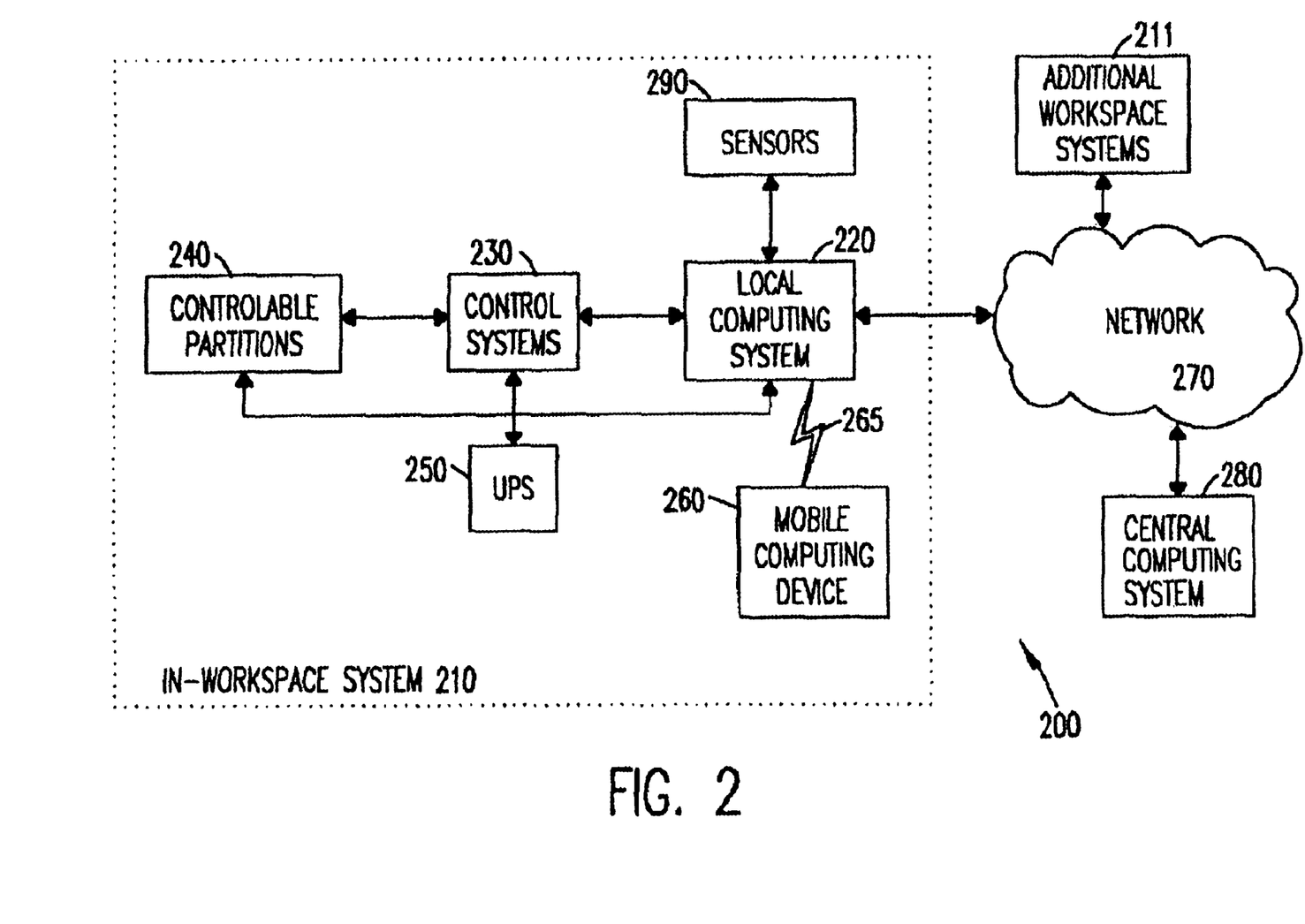
FIG. 2 is a block diagram of the system according to the invention.

FIG. 2 is a block diagram of the system computing components 200. The in-workspace components of the system include the local computing system 220, the control systems 230, the controllable partitions 240, UPS 250, sensors 290, a mobile computing device 260 with a wireless connection 265 to the local computing system. The local computing system may also be connected to a network 270 which has connections to other in-workspace systems 211.

In a preferred embodiment, when the occupant initiates a command stream to activate the partitions 240 via either wireless communication 265 from a mobile computing device 260 or directly from the localized computing system 220, the control systems 230 will activate the partitions to control their transparency. Additional commands may cause the movable partitions 240 to retract or deploy. When a mobile device is used, to be sure that the information transmitted from mobile device is valid, an authentication process will be conducted. Status information (e.g., the partitions are open or closed, transparent or opaque) of the transparent partitions is stored in the local computing system. In turn, a copy of the status information may be transferred to the central computing system 280 through the network 270. The central computing system 280 may be employed to control a set of workplace systems 210, 211, etc. For instance, in case of an emergency such as a fire, all of the movable partitions may be adjusted to a predetermined position, or they may be all set to the transparent mode.

In another embodiment, the activation of the transparent partitions can be initiated automatically to maintain the default environmental setting. The default environmental setting can be directly set from the local computing system, from the central computing system or via wireless communication from the mobile device. The default environmental setting may consist of the workspace environment parameters, such as sound level, light level, air flow, and temperature. The setting may be a function of time, or date. For instance, a greater intensity of light may be required during working hours. To adjust light levels for individual work spaces, the degree of transparency of the partitions may be varied. To reduce sound levels, the movable partitions may be deployed.

Figure 3:
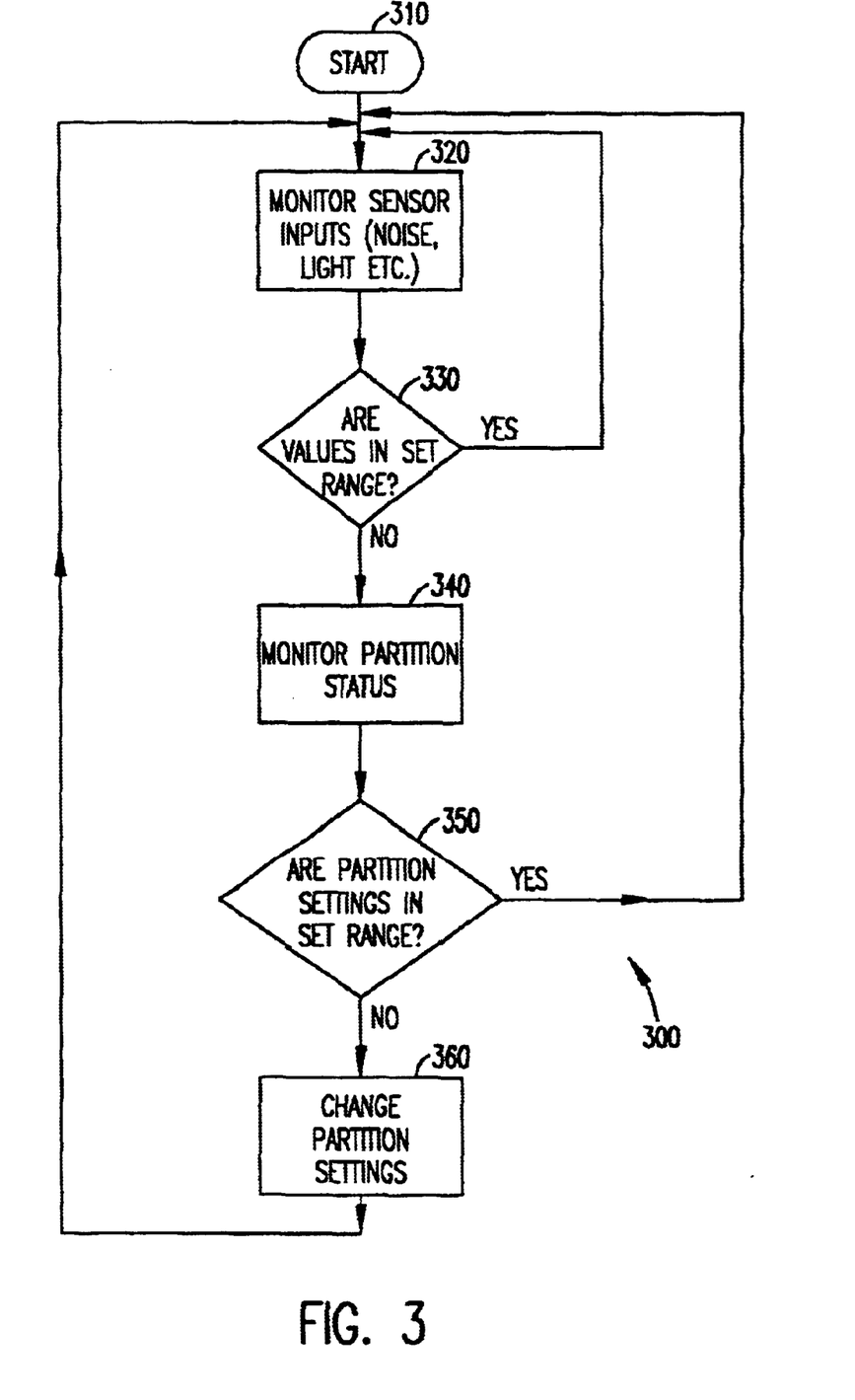
FIG. 3 is flow chart showing the logic of the control program running on the local computing system or server.

FIGS. 3, 4a, 4b, and 4c illustrate the method by which the panel settings may be adjusted. FIG. 3 shows an automated sequence 300. The sequence may be controlled either by the local computing system 220 or the central computing system 280 of FIG. 2. In step 320 of FIG. 3, the sensors monitor the ambient conditions. A test is made in decision block 330 to determine if the values are in the set range. If so, monitoring continues at step 310. If the values are not in the set range then a check is performed to see whether the partitions settings are in the set range to achieve the desired effect, steps 340 and 350. If the settings are correct, monitoring begins again 310. If the settings are not correct, they are changed, step 360.

Figure 4A:
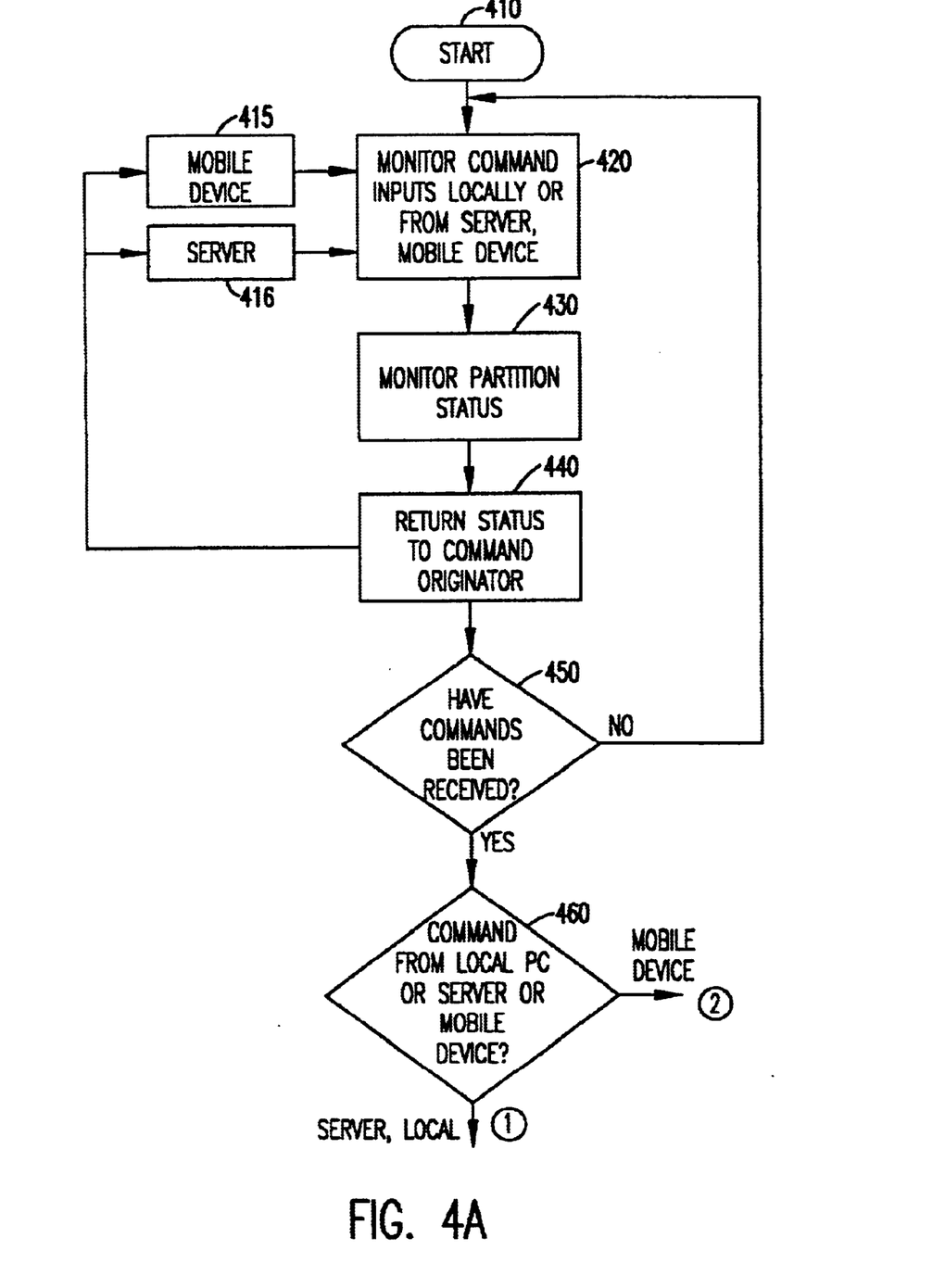
FIGS. 4a and 4b, taken together, are a flow chart showing the server and mobile computing device command sequence.
Figure 4B:
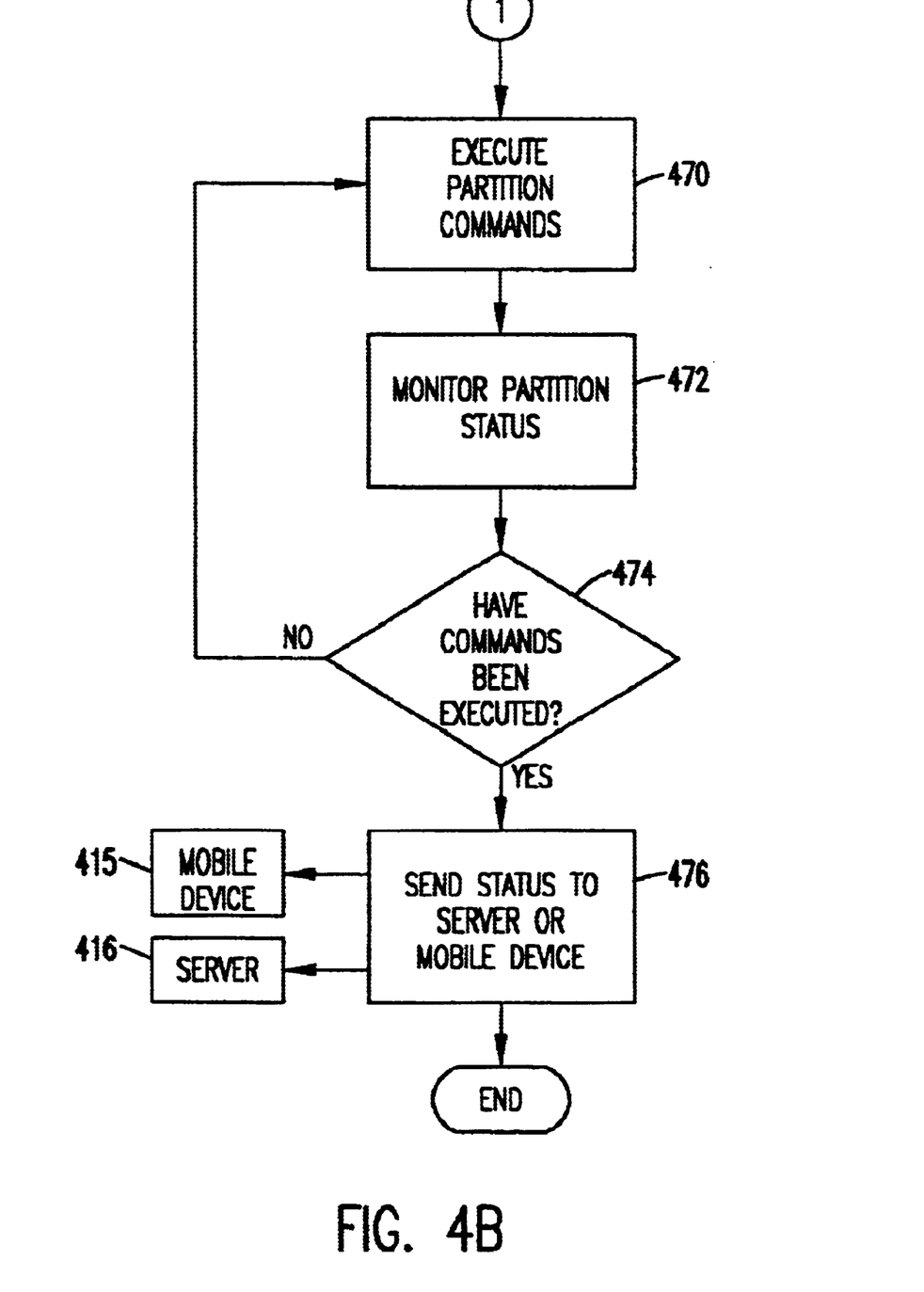
Figure 4C:
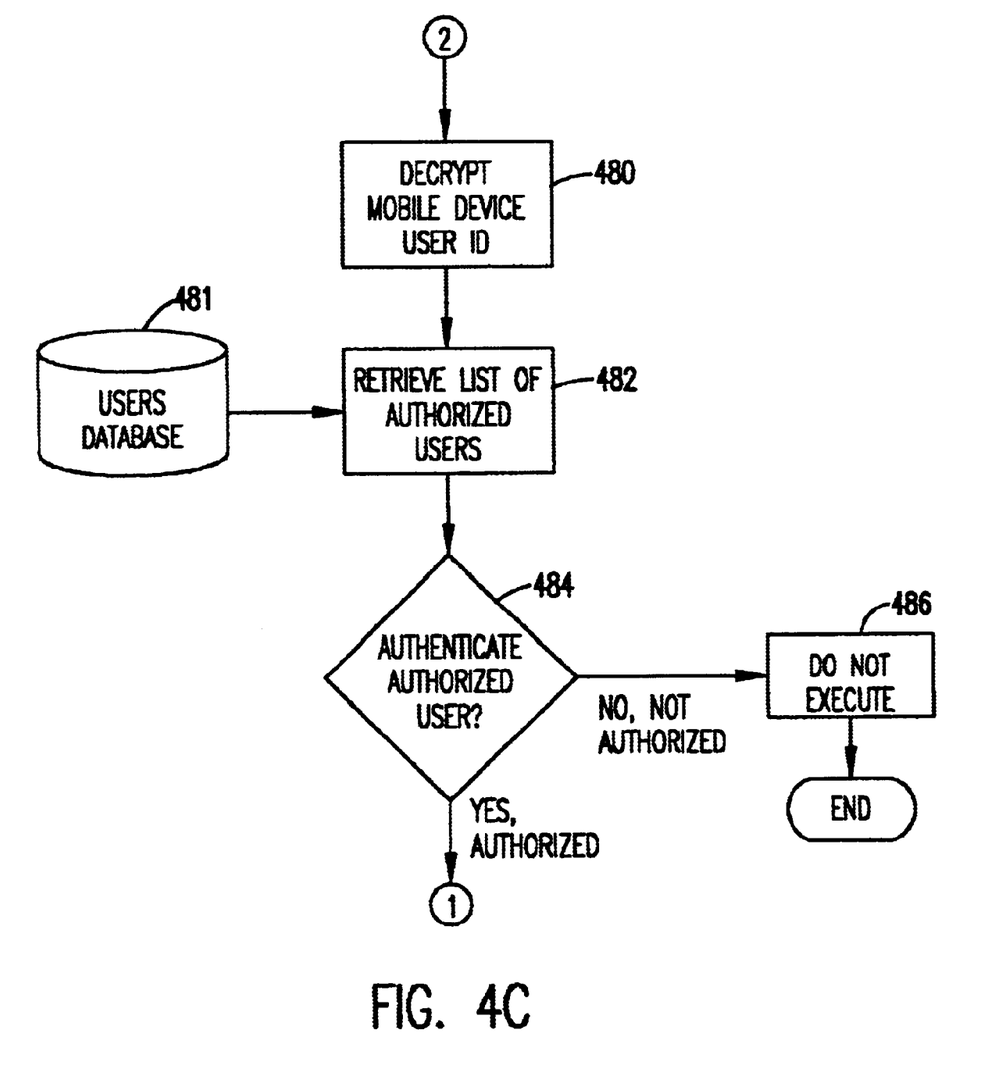
FIG. 4c is a flow chart showing the mobile device authentication command sequence.

FIGS. 4a and 4b illustrate the method for the input of commands to the system to change the partition settings. FIG. 4c illustrates the method for authentication of commands received from a mobile device.

Turning first to FIG. 4a, in step 420 commands may be entered directly into the local computing system directly using the I/O capability of the device; e.g., mouse, keyboard, diskette, etc. Alternatively, commands may be received from a mobile computing device 415 or the server 416. The system monitors the partition status settings at step 430 and can relay this status at step 440 to a mobile device or the server. If no commands are received as determined in step 450, monitoring continues. If commands have been received as determined in step 450, we must distinguish, in step 460, between those originating from the server or local computing system (PC or embedded computing device) and those originating from a mobile device. If the commands are determined to originate from the server or local computing system, we proceed to branch ① continued in FIG. 4b. If the commands originate from a mobile device, we proceed to branch ② continued in FIG. 4c. In the latter case, the commands must be authenticated.

Proceeding first via branch ②, FIG. 4c, we see that the commands from the mobile device are first decrypted in step 480. Then a list of authorized users is retrieved in step 482 from a users database 481. If the user is authorized as determined in step 484, we continue to branch ① continued on FIG. 4b. If the user is not an authorized user, no commands are executed in step 486.

Turning now to FIG. 4b, once a mobile user is authenticated or commands are received the local computing system executes the commands to change the partition settings in step 470, the status of the partitions is monitored in step 472. If commands have not been executed as determined in step 474, the system tries again in step 470. Such a loop will be executed only a limited number of times as determined, for example, by a counter or a time out timer. If the commands have been successfully executed as determined in step 474, the status can be returned in step 476 to the mobile device 415 or server 416.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for controlling an office workspace environment comprising:
   at least one controllable office partition at least partially enclosing an office cubicle workspace operable to control at least one environmental factor of the workspace, wherein said at least one controllable office partition is positioned in an array of office cubicles located within and divide the office workspace environment;
   a local computing system connected to said at least one controllable office partition for controlling said at least one environmental factor; and
   a network connected to said local computing system wherein said network connects the local computing system to at least one of a server, a wireless computing device connected by a wireless communication means, or at least one additional local computing system, wherein said at least one controllable partition is controlled by said local computing system activated according to an algorithm stored in the server.

2. A system for controlling an office workspace environment comprising:
   at least one controllable office partition at least partially enclosing an office cubicle workspace operable to control at least one environmental factor of the workspace, wherein said at least one controllable office partition is positioned in an array of office cubicles located within and divide the office workspace environment;
   a local computing system connected to said at least one controllable office partition for controlling said at least one environmental factor; and
   a network connected to said local computing system wherein said network connects the local computing system to at least one of a server, a wireless computing device connected by a wireless communication means, or at least one additional local computing system wherein a plurality of partitions are controlled by a plurality of local computing systems activated according to an algorithm stored in the server.

3. A system for controlling an office workspace environment comprising:
   at least one controllable office partition at least partially enclosing an office cubicle workspace operable to control at least one environmental factor of the workspace, wherein said at least one controllable office partition is positioned in an array of office cubicles located within and divide the office workspace environment;
   a local computing system connected to said at least one controllable office partition for controlling said at least one environmental factor; and
   a network connected to said local computing system wherein said network connects the local computing system to at least one of a server, a wireless computing device connected by a wireless communication means, or at least one additional local computing system wherein said wireless computing device is at least one of a PDA, a laptop computer or a mobile phone.

4. A system for controlling an office workspace environment comprising:
   at least one controllable office partition at least partially enclosing an office cubicle workspace operable to control at least one environmental factor of the workspace, wherein said at least one controllable office partition is positioned in an array of office cubicles located within and divide the office workspace environment;
   a local computing system connected to said at least one controllable office partition for controlling said at least one environmental factor; and
   a network connected to said local computing system wherein said network connects the local computing system to at least one of a server, a wireless computing device connected by a wireless communication means, or at least one additional local computing system wherein said wireless communication device is at least one of a device operating under one of Bluetooth, IrDA, IEEE 802.11, or mobile phone standards.

5. A system for controlling an office workspace environment comprising:
- at least one controllable office partition at least partially enclosing an office cubicle workspace operable to control at least one environmental factor of the workspace, wherein said at least one controllable office partition is positioned in an array of office cubicles located within and divide the office workspace environment; and
- a local computing system connected to said at least one controllable office partition for controlling said at least one environmental factor, wherein said at least one controllable partition has its position controlled by said local computing system and at least one of transparency and color.

6. A system for controlling an office workspace environment comprising:
- at least one controllable office partition at least partially enclosing an office cubicle workspace operable to control at least one environmental factor of the workspace, wherein said at least one controllable office partition is positioned in an array of office cubicles located within and divide the office workspace environment;
- a local computing system connected to said at least one controllable office partition for controlling said at least one environmental factor; and
- a wireless communication device, wherein said local computing system is connected to said wireless communication device, and wherein said wireless communication device is one of a PDA, a laptop computer or a mobile phone.

7. A system for controlling an office workspace environment comprising:
- at least one controllable office partition at least partially enclosing an office cubicle workspace operable to control at least one environmental factor of the workspace, wherein said at least one controllable office partition is positioned in an array of office cubicles located within and divide the office workspace environment, wherein said at least one controllable partition comprises a coating material which is at least one of liquid crystal polymer, electrophoretic material, or electrochromic material; and
- a local computing system connected to said at least one controllable office partition for controlling said at least one environmental factor.

8. A system for controlling an office workspace environment comprising:
- at least one controllable office partition at least partially enclosing an office cubicle workspace operable to control at least one environmental factor of the workspace, wherein said at least one controllable office partition is positioned in an array of office cubicles located within and divide the office workspace environment; and
- a local computing system connected to said at least one controllable office partition for controlling said at least one environmental factor, wherein said at least one controllable office partition is controlled by said local computing system when activated for at least one of fire, power failure and a situation requiring evacuation.

9. A computer implemented method for controlling a workspace environment comprising the steps of:
- providing at least one controllable office partition at least partially enclosing an office cubicle workspace operable to control at least one environmental factor of the workspace, wherein said at least one controllable office partition is positioned in an array of office cubicles located within and divide the office workspace environment; and
- controlling said at least one environmental factor using a local computing system connected to said at least one controllable office partition, wherein the local computing system controls said at least one environmental factor according to an algorithm stored in the local computing system wherein the algorithm includes code to control said at least one controllable partition in the case of at least one of fire, power failure or a situation requiring evacuation.

10. The computer implemented method of claim 9, wherein a plurality of local computing systems control a plurality of environmental factors according to an algorithm stored in the server.

11. A computer implemented method for controlling a workspace environment comprising the steps of:
- providing at least one controllable office partition at least partially enclosing an office cubicle workspace operable to control at least one environmental factor of the workspace, wherein said at least one controllable office partition is positioned in an array of office cubicles located within and divide the office workspace environment;
- controlling said at least one environmental factor using a local computing system connected to said at least one controllable office partition;
- connecting the local computing system to a server over a network; and
- communicating environmental conditions of work spaces over the network to the server.

12. The computer implemented method of claim 11, wherein the local computing system controls said at least one environmental factor according to an algorithm stored in the server.

13. The computer implemented method of claim 12, wherein the algorithm includes code to control said at least one controllable partition in the case of at least one of fire, power failure or a situation requiring evacuation.

14. In an array of office cubicles which are positioned in an office work space, an office partition positioned within said array which controls the environment of a workspace comprising:
- means for mechanically controlling said office partition wherein said means for mechanically controlling said office partition effects mechanical movement of portions of said partition to alter at least one of sound level and air flow;
- means for electrically controlling said office partition wherein said means for electrically controlling said office partition effects at least one of transparency and color of at least a portion of said office partition; and
- a local computing system connected to said office partition which interfaces with said means for mechanically controlling said office partition and said means for electrically controlling said office partition for controlling the environment of said workspace.

* * * * *